Sept. 28, 1971     V. A. OSBORNE     3,608,328
ABSORPTION REFRIGERATION SYSTEM
Filed March 18, 1970
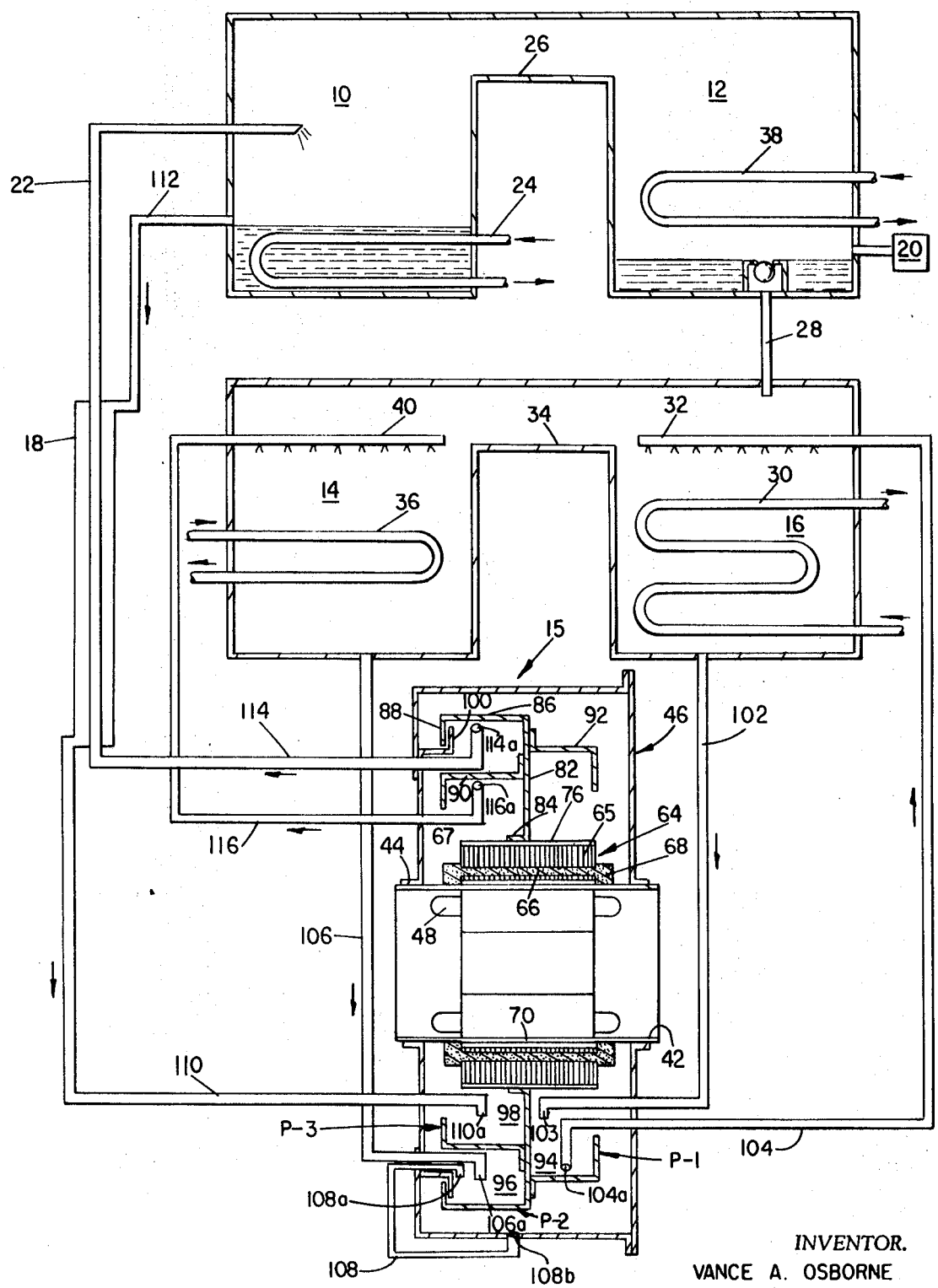
INVENTOR.
VANCE A. OSBORNE
BY *Frank N. Decker Jr.*
ATTORNEY

United States Patent Office

3,608,328
Patented Sept. 28, 1971

3,608,328
ABSORPTION REFRIGERATION SYSTEM
Vance A. Osborne, Liverpool, N.Y., assignor to
Carrier Corporation, Syracuse, N.Y.
Filed Mar. 18, 1970, Ser. No. 20,767
Int. Cl. F25b *15/06;* H02k *7/00*
U.S. Cl. 62—476                1 Claim

ABSTRACT OF THE DISCLOSURE

An absorption refrigeration system wherein there is provided fluid transfer apparatus having a stationary hermetic nonferromagnetic housing encasing rotor means to which is connected for rotation in unison therewith pump means for circulating absorbent solution through the system, the rotor means being supported in magnetically inductive relation with a stator located exteriorly of the hermetic housing. The laminations of the rotor means have embedded therein a plurality of circumferentially spaced carbon conductor rods cast or pressed in integral relation with carbon shorting rings at the opposite ends thereof which also function as bearing means for the rotor.

BACKGROUND OF THE INVENTION

This invention relates to absorption refrigeration systems and especially to pumps adapted for use therein. It is known in the art to employ centrifugal pumps to circulate strong absorbent solution to an absorber, to also circulate weak absorbent solution from the absorber through a solution heat exchanger to the generator, and further to circulate relatively cold refrigerant to the evaporator. Centrifugal pumps, unfortunately, require that a positive head exist in order to force the liquid into the impeller eye without flashing and vapor binding. Accordingly, it has been proposed to circulate absorbent solution in an absorption refrigeration system by using one or more scoop pumps generally taking the form of a closed chamber within which is rotatably mounted a rotatable pan for centrifugally impelling liquid directed into the chamber through an inlet conduit. The liquid is picked up by a scoop or eduction tube disposed in the pan. Scoop pumps have among their advantages simplicity of construction and will operate satisfactorily with little or no suction head and even through only a relatively small quantity of liquid is fed to them.

However, the prior drive arrangements for scoop pumps have not at all times been completely successful. It is known to drive the scoop pumps by an exteriorly mounted motor having a shaft connected through the housing by a mechanical seal to the scoop pump pan. However, mechanical seals are subject to leakage and wear and are expensive to replace. It has therefore been proposed to drive the scoop pumps by means of magnetic couplings connected to an exteriorly located motor. However, magnetic couplings require maintenance of close tolerances in order to avoid possible misalignment problems. Further, in a magnetic coupling arrangement of this character, a magnetic coupling additional to that available in the motor itself is required, which naturally adds to the cost of the machine.

One solution to these problems is to utilize an inverse motor with the rotor located within the pump housing and coupled to the stator outside the housing through a nonferromagnetic wall. Motor rotors are, of course, equipped with conductor rods, and in conventional motors the rods are constructed of aluminum or like materials. However, while aluminum is quite satisfactory in an exteriorly mounted motor employed in an absorption refrigeration machine, aluminum conductor rods are subject to corrosion when used in an inverse motor exposed to lithium bromide absorbent solution. Obviously, a conductor rod material is needed which will withstand the deleterious effects of lithium halide absorbent solution.

SUMMARY OF THE INVENTION

In accordance with this invention, there is provided an absorption refrigeration machine which embodies therein fluid transfer apparatus comprising a housing having a central, generally cylindrical, nonferromagnetic housing wall. An annular motor rotor is disposed in the housing and is provided with a plurality of circumferentially spaced carbon conductor rods extending through the rotor core laminations. The carbon conductor rods are joined at opposite ends with annular shorting rings which also function as bearing means and rotate in running relation with the housing. Utilization of the shorting rings as bearing means also simplifies the construction, and the use of carbon in substitution for aluminum and like materials precludes the possibility of corrosion of the rods upon exposure to lithium halide absorbent solutions.

BRIEF DESCRIPTION OF THE DRAWING

The single view is a schematic flow diagram, partially in cross section, of an absorption refrigeration system embodying a fluid transfer apparatus in accordance with this invention.

DESCRIPTION OF THE PREFERRED EMBODIMENT

In accordance with a preferred embodiment of this invention, there is provided an absorption refrigeration system which utilizes water as a refrigerant and an aqueous solution of lithium bromide as an absorbent. A suitable compound, such as octyl alcohol (2-ethyl-n-hexanol), may be added to the solution for heat transfer promotion, and suitable corrosion inhibitors also may be used. "Strong solution" as referred to herein is a concentrated solution of lithium bromide, which is strong in absorbing power, and "weak solution" is a dilute solution of lithium bromide which is weak in absorbing power.

Referring now to the drawing, there is shown an absorption refrigeration system comprised of a generator 10, a refrigerant condenser 12, an absorber 14, an evaporator 16, a solution heat exchanger 18, and fluid transfer apparatus designated generally 15. A purge unit 20 may be employed to remove relatively noncondensable vapors from the system.

Generator 10 comprises a boiler to which weak absorbent solution is directed from heat exchanger 18 through conduit means 22. The weak solution is boiled in the generator by a heat source such as steam pipe 24 to concentrate the absorbent solution by vaporizing refrigerant therefrom. Other types of well-known boilers or generators employing a combustible gas may, of course, be utilized in substitution for the arrangement schematically shown.

Water vapor boiled off from the weak solution in generator 10 is passed through passage 26 and condensed in condenser 12. Refrigerant condensate is directed by conduit means 28 to evaporator 16. A heat exchanger 30, through which a medium to be cooled flows, is located in the evaporator. A spray header 32 is also disposed in the evaporator to wet the surfaces of the heat exchanger 30 with liquid refrigerant circulated from the evaporator tank. Refrigerant is evaporated in the evaporator to cool the medium passing through heat exchanger 30.

Absorbent solution in absorber 14 absorbs the water vapor formed in evaporator 16 which passes thereto through passage 34. Heat exchangers 36 and 38, connected to a source of cooling medium, such as water, are located in absorber 14 and condenser 12, respectively, to remove waste heat from the refrigeration cycle. Also located in the absorber 14 is spray header 40 which serves to wet the surfaces of coil 36 with absorbent solution.

Fluid transfer apparatus 15, to which the instant invention is particularly directed preferably comprises a stationary, generally cylindrical and centrally located inner nonhermetic, nonferromagnetic housing wall 42 to which is welded or otherwise secured as at 44 to an annular outer hermetic housing 46. Secured to wall 42 of housing 46 by welding is an annular motor stator 48 centrally disposed between opposite ends of the cylindrical housing wall 42, and having windings 48a connected to a source of electrical power. The housing wall is desirably open-ended to provide an air flow path therethrough to adequately cool the stator 48. A fan may be located exteriorly of the housing to cause a forced air flow therethrough, or in the alternative, a fan may be positioned within the housing by connection to suitable structure at opposite ends of the housing.

The inverse motor forming a part of fluid transfer apparatus 15 of this invention further includes an annular rotor 64 having a plurality of laminations 65 having axial slots in which are embedded, preferably by molding, a plurality of axially extending circumferentially spaced carbon conductor bars or rods 66. A pair of annular shorting rings 67 and 68 abut opposite ends of the rotor bars 64 and are in bearing relation with the outer diameter of housing wall 42. As appears, rotor 64 and the housing wall 42 are slightly spaced as at 70 to provide clearance therebetween.

Prior to the present invention, aluminum rotor conductor rods have been employed and have performed with success in conventional motors where they have not been exposed to lithium bromide absorbent solution. However, in an inverse motor wherein the relative positions of the stator and rotor are reversed, aluminum cannot be satisfactorily utilized. Carbon is eminently suitable, not being subject to the corrosive effects of lithium halide solutions, and is well suited to a casting or pressing operation wherein the shorting-bearing rings may be formed on opposite ends of the conductor rods in the same operation. A composite unitary structure is thereby achieved having remarkable strength properties, and further eliminating the need for a separate brazing or welding step. Various known manufacturing techniques in addition to casting or pressing may be used, as for example powder metallurgy.

There is shown in the drawing a plurality of scoop pump pans designated generally by the legends P-1, P-2, and P-3, three pumps being provided in the exemplary embodiment shown, although obviously this number can be varied depending upon the particular fluid conditioning functions to be performed. The scoop pump structure may be formed by a radially extending main wall member 82 having a flange portion 84 welded or otherwise secured to annular wall portion 76 affixed to rotor 64, the opposite end of wall member 82 being connected to an axially directed wall portion 86 from which extends a radially inwardly directed wall portion 88. Also connected to the main wall member 82, as by welding, are a pair of flange members 90 and 92. The scoop pump wall structure described defines a refrigerant circulation chamber 94 and a pair of solution circulation chambers 96 and 98. To pressure isolate the relative high pressure chambers 96 and 98 from the relatively low pressure chamber 94, the annular hermetic housing 46 is provided interiorly with a flange portion 100 which cooperates with wall portion 88 of the chamber 96 to provide a hydrodynamic seal.

Leading from evaporator 16 is conduit means 102 having a discharge nozzle 103 for transferring liquid refrigerant into evaporator circulation chamber 94 wherein it is centrifugally impelled and pumped therefrom through eduction orifice 104a of conduit means 104 and spray header 32 into evaporator 16. Solution circulation chamber 96 has fed thereto weak relatively cool solution from absorbed 14 through conduit 106 provided with a discharge nozzle 106a. Also communicating with this chamber is discharge nozzle 108a of pickup scoop 108 having an eduction orifice 108b positioned adjacent the bottom of housing 46 for transferring to the chamber 96 any fluid which might splash from the chambers 94, 96 or 98 into the housing, and also to pump liquid which drains into the housing bottom upon machine shutdown. Since the strong and weak solutions can intermix on shutdown, even though no significant amount of refrigerant combines therewith, solution solidification is effectively prevented.

Solution circulation chamber 98 has disposed therein discharge nozzle 110a of conduit means 110 for transferring thereto strong solution from generator 10 through conduit 112 and solution heat exchanger 18. A degree of flash cooling takes place in the chamber 98, the flash vapors being absorbed by solution in chamber 96 to warm the solution therein, while the temperature of the solution in chamber 98 is reduced. Weak solution is pumped from chamber 96 through eduction orifice 114a of conduit 114 and transferred through solution heat exchanger 18 into generator 10 to be reconcentrated therein. Essentially simultaneously, strong solution is transferred from chamber 98 through eduction orifice 116a of conduit 116 forming a part of scoop pump P–3 and is pumped to absorber 14 to be discharged therein through sprayer header 40.

Fluid transfer apparatus 15 incorporates an inverse motor wherein a motor stator is positioned within a cylindrical nonferromagnetic housing wall 42 connected exteriorly to an annular hermetic housing 46 in which is located a motor rotor having pump means, desirably of the scoop type, connected thereto for circulating one or more fluids through the refrigeration system in response to rotor rotation magnetic induced by the stator. The rotor member includes laminations 65 having embedded therein a plurality of circumferentially spaced, axially extending carbon conductor rods 66 formed by casting or pressing. The conductor rods are electically and mechanically formed at opposite ends with annular electrically conducting carbon shorting rings 68 which also function as bearing means and rotate in running relation with the cylindrical central housing wall 42, which may be made of stainless steel. The rods and rings form a squirrel cage motor rotor winding. Utilization of the shorting rings as bearing means also simplifies the construction, and the use of carbon in substitution for aluminum and like materials precludes the possibility of corrosion of the rods upon exposure to lithium halide absorbent solution.

Various changes and modifications of this invention may be effected without departing from the scope of the following claim.

I claim:

1. An absorption refrigeration system comprising an evaporator, an absorber, a generator, a condenser, and a fluid transfer apparatus comprising: a housing having a cylindrical, nonferromagnetic wall, a stator mounted adjacent the inner cylindrical surface of said wall, a rotor mounted in said housing adjacent the exterior cylindrical surface of said wall in magnetically inductive relation with said stator through said wall, pump means connected to said rotor and rotatable therewith in response to energization of said stator from a source of electrical energy to pump fluid in said refrigeration system, a plurality of carbon conductor rods embedded in the rotor in circumferentially spaced relation and extending axially along the rotor, and a pair of carbon shorting rings integral with the rods, said carbon conductor rods and shorting rings forming a squirrel cage motor rotor winding, said shorting rings bearing against the exterior surface of said nonferromagnetic wall to provide a bearing for said motor rotor member.

References Cited

UNITED STATES PATENTS

| | | | |
|---|---|---|---|
| 2,225,338 | 12/1940 | Geiss | 310—670UX |
| 2,740,910 | 4/1956 | Fleischer | 310—211 |
| 2,768,583 | 10/1956 | Richard et al. | 310—67X |
| 2,983,117 | 5/1961 | Edberg et al. | 62—476 |

WILLIAM F. O'DEA, Primary Examiner

P. D. FERGUSON, Assistant Examiner

U.S. Cl. X.R.

310—67, 211, 266; 415—87, 88, 89